US005994661A

United States Patent [19]

Schafer

[11] Patent Number: 5,994,661

[45] Date of Patent: Nov. 30, 1999

[54] THERMO-QUIESCENT RESERVOIR SYSTEM FOR A GASEOUS-DISCHARGE DEVICE

[75] Inventor: Ralph Dean Schafer, Williamsport, Pa.

[73] Assignee: Litton Systems, Inc., Woodland Hills, Calif.

[21] Appl. No.: 08/970,292

[22] Filed: Nov. 14, 1997

[51] Int. Cl.[6] ........................................................ B23K 9/00

[52] U.S. Cl. .................... 219/121.36; 219/521; 219/523; 219/544; 219/538; 219/520; 219/552; 219/553

[58] Field of Search ............................... 219/121.36, 521, 219/523, 544, 538, 520, 552, 553; 392/503, 497

[56] References Cited

U.S. PATENT DOCUMENTS 3,632,978 1/1972 Wrob ....................................... 219/335
5,598,502 1/1997 Takahashi et al. ....................... 392/502
5,850,073 12/1998 Eckert ..................................... 219/523

*Primary Examiner*—Mark Paschall
*Attorney, Agent, or Firm*—O'Melveny & Myers LLP

[57] ABSTRACT

The reservoir system includes a heater coil having electrical leads adapted to be coupled to a voltage source. The heater coil is adapted to generate heat in correspondence with a heater voltage provided by the voltage source. A reservoir material layer is adapted to regulate pressure of a gas disposed within the gaseous-discharge device in accordance with temperature of the reservoir material. Heat is transferred from the heater coil to the reservoir material through a series of thermally conductive layers in which each of the layers have different thermal conductivity and coefficients of expansion. As a result, the thermal path resistance between the heater coil and the reservoir material layer increases as temperature of the heater coil increases so that the reservoir material increases in temperature at a slower rate than the heater coil.

37 Claims, 3 Drawing Sheets

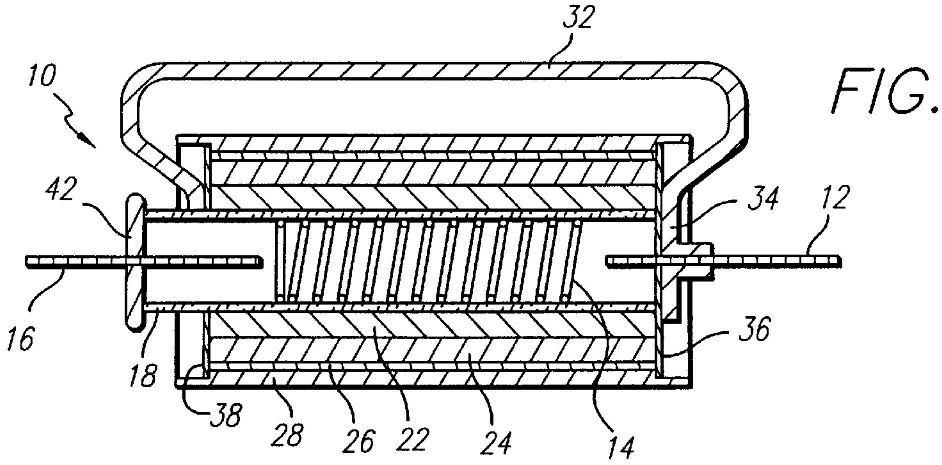
FIG. 1
FIG. 2
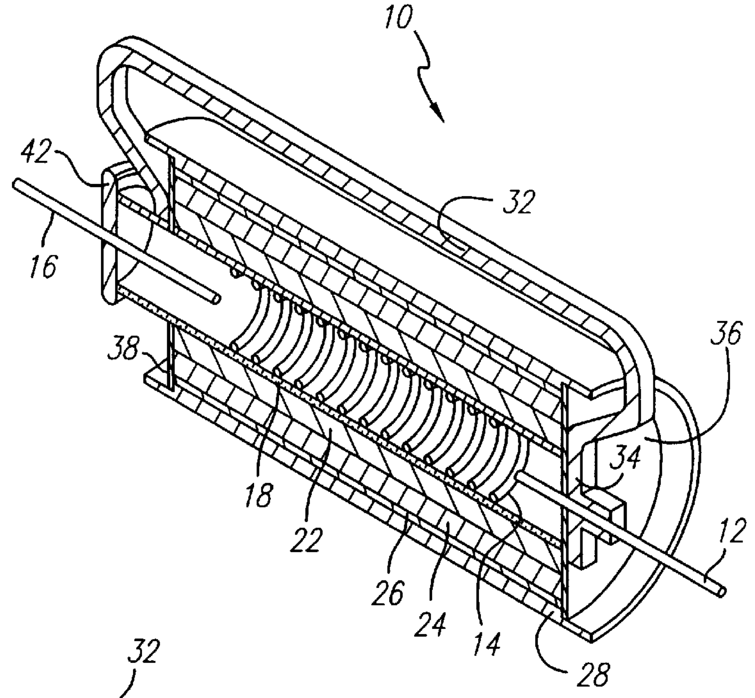
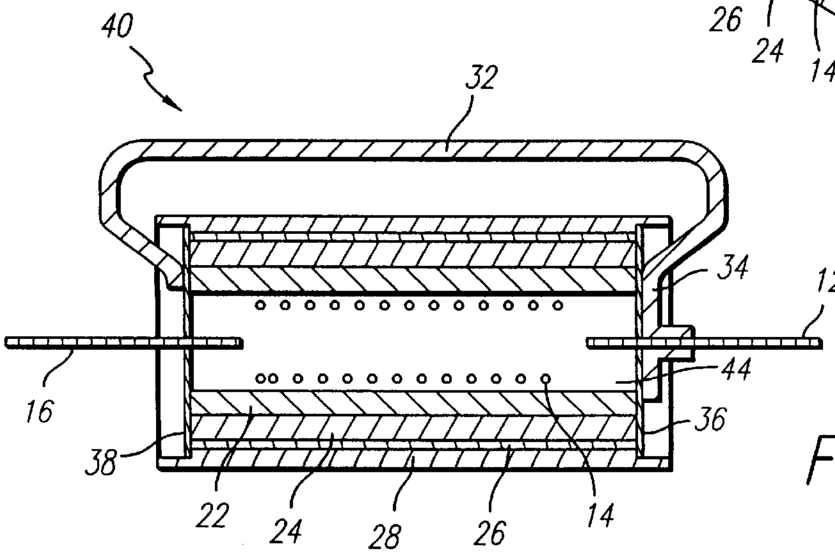
FIG. 3

THERMO-QUIESCENT RESERVOIR SYSTEM FOR A GASEOUS-DISCHARGE DEVICE

BACKGROUND OF THE INVENTION

1. Field of the Invention

The present invention relates to switching systems utilizing gaseous discharge effects to conduct large amounts of electric current, and more particularly, to an improved hydrogen reservoir for use in thyratrons and other types of gaseous-discharge devices.

2. Description of Related Art

It is well known in the art to utilize gaseous discharge effects to conduct large amounts of electric current. For example, a thyratron is a type of electric switch that rapidly conducts electric current between a cathode and an anode by use of a controlled gaseous discharge. A grid is disposed between the cathode and anode. When a suitable positive voltage pulse is applied to the grid, a plasma forms in the region defined between the grid and the cathode. The anode voltage produces an electric field that penetrates the grid and attracts the electrons migrating from the cathode via the plasma. The electric field subsequently causes electrical breakdown between the cathode and the anode through the grid, and in so doing, electric current is conducted through the device. Thus, thyratrons have the ability to stand-off high voltage levels while in the non-conductive "off" state, and to conduct high current levels while in the conductive "on" state. Moreover, the switching between the off and on states can be made to occur very rapidly, i.e., in sub-microsecond time scales.

In thyratrons and other types of gaseous-discharge devices, hydrogen is the medium of ionization that allows the device to conduct large amounts of current in short periods of time. It is well known that hydrogen gas is depleted during electrical discharges. To replenish the depleted hydrogen, reservoirs are used to provide a supply of hydrogen for the thyratrons and maintain the hydrogen equilibrium pressure within the devices. Alternatively, gaseous-discharge devices may also utilize deuterium as an ionization medium, and it should therefore be appreciated that this description applies to systems utilizing either hydrogen or deuterium reservoirs.

The stabilization of the hydrogen equilibrium pressure within certain defined limits is critical to the overall performance of the gaseous-discharge device. For example, if the equilibrium pressure is too low, the anode heat dissipation may be too great causing the device to experience a "red" anode and burn a hole through the envelope of the device. Further, low equilibrium pressure could also result in "trigger failure," a condition in which the thyratron fails to go into the conductive state after the triggering positive voltage pulse is applied to the grid. Conversely, if the equilibrium pressure is too high, the voltage stand-off limit may be exceeded causing undesired voltage breakdown between the cathode and the anode. In such a situation, the device may experience uncontrolled current runaway or a "latch-up" condition.

The repetitive pulse rate at which a gaseous-discharge device may be switched is the reciprocal of the high voltage recovery time of the device. A recovery condition results from the diffusion of hydrogen ions formed during current conduction into the side walls of the device, followed by recombination of the ionized hydrogen with electrons. The recovery time is therefore the time required to "open" the switch, or the time duration of de-ionization process until a subsequent application of high voltage between the cathode and anode is possible without re-conduction through the grid. The lower the hydrogen equilibrium pressure, the faster de-ionization can occur and the faster the device recovery time.

A typical hydrogen reservoir for a gaseous-discharge device comprises a heater circuit coupled to a reservoir material, in which the reservoir material controls the hydrogen pressure in accordance with changes in temperature by the heater circuit. The reservoir material forms interstitial hydrides which adsorb/absorb hydrogen as well as release hydrogen as the temperature of the reservoir material is varied. Temperature and pressure are therefore variables that are controlled by the voltage applied to the heater circuit. During manufacture, the gaseous-discharge device is back-filled with hydrogen following high temperature processing of the device to exhaust undesirable impurities. At a set input voltage of the reservoir heater, the pressure of the device is increased by filling the device with hydrogen until a desired equilibrium pressure is reached. Thereafter, during operation of the device, the hydrogen pressure is controlled by varying the heater input voltage.

The recovery time of the gaseous-discharge device depends on the relationship between the de-ionization rate and the reservoir system parameters. By changing the input voltage applied to the reservoir heater circuit, and therefore the temperature of the reservoir, the hydrogen pressure is adjusted to achieve a desired recovery rate. An important parameter of such reservoir systems is the operating range between the minimum and maximum reservoir heater voltage. These limits are determined by various factors, including the external electrical system parameters, the device geometry, and the rate of pressure change of the reservoir with the input voltage. Assuming that the electrical system parameters and grid geometry are constants, then the acceptable operating range of the device is purely a function of pressure and temperature.

If the reservoir system has a high pressure (P) variation with respect to the reservoir heater temperature (T) variation (dP/dT), the operating range will be rather small. Furthermore, with a high dP/dT, the pressure changes drastically with correspondingly small changes in the reservoir input voltage (V). This is particularly undesirable since the device can experience unstable operation from temperature fluctuations that occur due to uncontrolled line voltage shifts. Conversely, if the reservoir system has a low dP/dT, the operating range will be relatively large. The ratio of change in pressure to change in voltage (dP/dV) corresponds generally to dP/dT, and for an ideal reservoir heater in which temperature changes linearly with input voltage, the terms are considered to be equivalent.

Ideally, the reservoir will not vary significantly in temperature during device operation when set at any given heater voltage, but in practice this is difficult to achieve. As known in the art, the reservoir material typically comprises barium, zirconium, tantalum, or titanium; however, titanium is the most frequently utilized. The titanium reservoir material may be provided in one of two forms: (1) sintered, powdered titanium hydride in a container; or (2) solid titanium. As illustrated graphically in FIG. 7, solid titanium reservoirs have relatively high dP/dV, though they are simpler and thus less costly. Sintered titanium hydride reservoirs have generally lower dP/dV than solid titanium reservoirs, and therefore provide greater operating range and stability, but are costly to manufacture.

Another significant disadvantage of prior art hydrogen reservoirs is that there is often an initial pressure swing opposite to the direction which normally results from a change in reservoir input voltage. Particularly, when the voltage on the reservoir heater is increased, there may be an initial drop in hydrogen pressure before the reservoir stabilizes to the new temperature and begins to increase the hydrogen pressure. Similarly, there may be an initial increase in hydrogen pressure when the reservoir voltage is decreased. The initial pressure swing can have catastrophic effects to the operation of a gaseous-discharge device. For example, if a gaseous-discharge device is operating at an upper limit of anode temperature and the reservoir voltage is increased to raise the equilibrium pressure, the initial drop in hydrogen pressure could result in a red anode condition. To date, the cause of the opposite pressure swing phenomenon is not completely understood, and it is therefore highly desirable to provide a reservoir structure that does not exhibit such characteristics.

One approach to regulating the dP/dV relationship is to use an additional device known as a barretter. The barretter is an electrical component coupled in series with the reservoir system, and controls the dP/dV by regulating the input voltage provided to the reservoir heater. Despite the advantages of improved stability, adding a barretter to a reservoir system increases the complexity and cost of the system, and in certain small device applications the additional element could be simply prohibitive. Moreover, the barretter requires a longer warm-up time than the associated reservoir system, rendering the device impractical for applications in which a fast start is required.

Thus, a reservoir system for a gaseous-discharge device having uniformly low dP/dV characteristics across an operating range of the device without increasing the cost and complexity of the reservoir system would be highly desirable.

SUMMARY OF THE INVENTION

In accordance with the teachings of the present invention, a reservoir system for a gaseous-discharge device provides low dP/dV with far greater uniformity than any of the prior art reservoir systems, and without substantially increasing the cost or complexity of the reservoir system.

As in the prior art systems, the reservoir system of the invention includes a heater coil having electrical leads adapted to be coupled to a voltage source. The heater coil is adapted to generate heat in correspondence with a heater voltage provided by the voltage source. A reservoir material layer is adapted to regulate pressure of a gas disposed within the gaseous-discharge device in accordance with temperature of the reservoir material. In the reservoir system of the invention, heat is transferred from the heater coil to the reservoir material through a series of thermally conductive layers in which each of the layers have different thermal conductivity and coefficients of expansion. As a result, the thermal path resistance between the heater coil and the reservoir material layer increases as temperature of the heater coil increases so that the reservoir material increases in temperature at a slower rate than the heater coil.

The heater coil of the reservoir system is provided within a ceramic cylinder that provides an electrically insulating layer. A first thermally conductive layer of molybdenum is coupled to the ceramic cylinder. Due to the high thermal conductivity of the first thermally conductive layer, heat is evenly conducted from the heater coil through the ceramic cylinder and the first thermally conductive layer. A second thermally conductive layer of stainless steel is coupled to the first thermally conductive layer. The stainless steel layer has a coefficient of expansion that is substantially greater than that of the molybdenum layer and a thermal conductivity less than that of the molybdenum layer. A third thermally conductive layer of nickel is coupled between the second thermally conductive layer and the reservoir material layer. The nickel layer is highly ductile to absorb expansion of the stainless steel layer. As the temperature of the heater coil increases, the stainless steel layer expands into the ductile nickel layer. Heat is conducted through the stainless steel and nickel layers into the reservoir material layer, but the increased thermal resistance of the stainless steel layer slows the increase in temperature of the reservoir material. Thus, the reservoir material reacts more slowly to abrupt changes in temperature by the heater coil.

A more complete understanding of the thermo-quiescent reservoir system for a gaseous-discharge device will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a sectional side view of a first embodiment of a thermo-quiescent reservoir system for a gaseous-discharge device;

FIG. 2 is a partial perspective view of the thermo-quiescent reservoir system of FIG. 1;

FIG. 3 is a sectional side view of a second embodiment of a thermo-quiescent reservoir system for a gaseous-discharge device;

DETAILED DESCRIPTION OF THE PREFERRED EMBODIMENT

Figure 4:
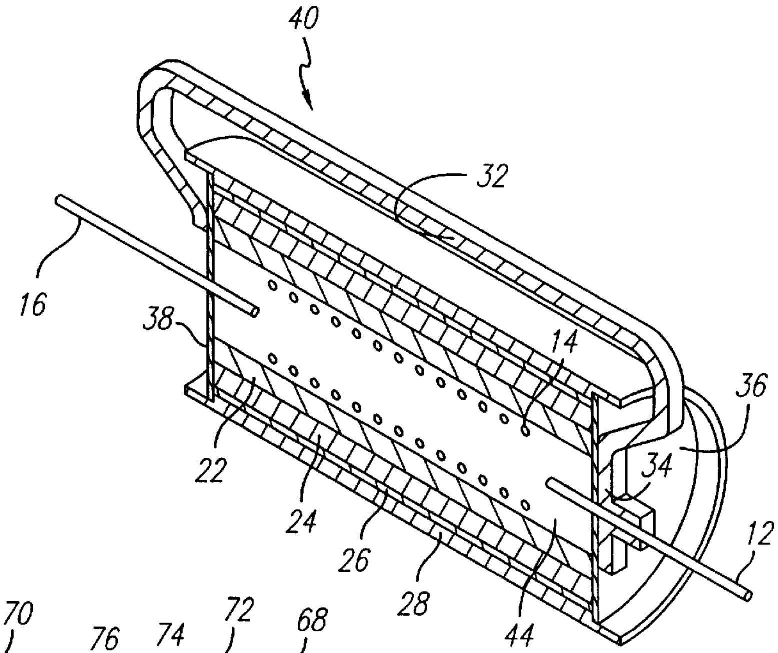
FIG. 4 is a partial perspective view of the thermo-quiescent reservoir system of FIG. 3.

The present invention satisfies the need for a reservoir system for a gaseous-discharge device having uniformly low dP/dV characteristics across an operating range of the device without increasing the cost or complexity of the reservoir system. In the detailed description that follows, like element numerals are used to describe like elements illustrated in one or more of the figures.

Referring first to FIGS. 1 and 2, a first embodiment of a thermo-quiescent reservoir 10 for a gaseous-discharge device is illustrated. The reservoir 10 comprises a heating coil 14 having end terminal leads 12, 16. As known in the art, the heating coil 14 comprises a continuous coil of electrically-resistive material that increases in temperature upon application of a voltage across the end terminal leads 12, 16. The heating coil 14 is disposed within a cylindrical sleeve 18 such that the outer surface of the coil engages the inner surface of the sleeve. The sleeve 18 is sealed at a first end thereof by a cap 42. The sleeve 18 is comprised of thermally conductive and electrically insulative materials, such as ceramic, enabling heat generated by the heating coil 14 to pass substantially therethrough without causing electrical shorting across the coil. It should be appreciated that thermal expansion of the heating coil 14 upon operation of the reservoir 10 causes the coil to press tightly against the inner surface of the sleeve with the distance between adjacent loops of the heating coil increasing to accommodate the thermal expansion.

The sleeve 18 is surrounded by a plurality of successive concentric cylindrical layers of different materials selected on the basis of their respective thermal conductivity, coefficient of expansion and other properties. The successive layers include a first layer 22, a second layer 24, a third layer 26 and a fourth layer 28. The first layer 22 is comprised of a metallic material having generally high thermal conductivity and low coefficient of expansion, such as molybdenum (i.e., 0.003 per inch at 700° C.) or tungsten. The second layer 24 is comprised of a metallic material having generally poor thermal conductivity and high coefficient of expansion, such as stainless steel (i.e., 0.013 per inch at 700° C.). The third layer 26 is comprised of a metallic material having generally high ductility, such as nickel. Unlike the other layers, the third layer 26 is not a closed cylinder, but rather has an expansion slot that extends along an axial direction of the layer. The third layer 26 may be formed into the cylindrical shape from a sheet of material in which the edges of the sheet do not meet, with the gap between the edges defining the expansion slot. Lastly, the fourth layer 28 is comprised of the reservoir material, such as titanium or zirconium.

The respective ends of the successive layers 22, 24, 26, 28 are enclosed by end plates 36, 38. The end plates 36, 38 may be comprised of a ductile material, such as nickel, to absorb the axial expansion of the successive layers 22, 24, 26, 28. The first end plate 36 comprises a circular disk having a center hole to permit the terminal lead 12 to extend outwardly therethrough. The second end plate 38 also comprises a circular disk having a center hole, however, the center hole of the second end plate is larger to accommodate the sleeve 18 which extends outwardly therethrough. The sleeve 18 extends in an axial direction farther than the successive layers 22, 24, 26, 28, so that the electrical connection to the terminal lead 16 is insulated from the successive layers.

A support leg 32 is coupled between the two end plates 36, 38 to provide a mounting structure for the reservoir 10, as well as to serve as a heat sink for the reservoir. The support leg 32 comprises an elongated strap that is coupled at a first end to the end plate 38, and at a second end to the end plate 36. At the second end, the support leg 32 has a flattened portion 34 that extends radially along the surface of the end plate 36. The terminal lead 12 extends through a hole provided through the flattened portion 34. The terminal lead 12 may be electrically connected to the first end plate 36 and to the flattened portion 34 of the support leg 32.

In operation, heat from the heating coil 14 is conducted to the sleeve 18, and is evenly conducted through the first layer 22 into the second layer 24. The conducted heat causes the second layer 24 to expand so that its outer surface compresses the third layer 26 into the fourth layer 28 to produce a good thermal path between the third and fourth layers. The third layer 26 further acts as a cushion under the stress of compression by the second layer 24. As the second layer 24 expands away from the first layer 22, the thermal resistive path to the second layer, and hence to the fourth layer 28, is increased due to the extremely low thermal conductivity of the second layer and the poor thermal contact between the first and second layers. This increase in the thermal resistive path as the temperature of the heating coil 14 increases slows the heat transfer to the fourth layer 28, so that the fourth layer temperature increases at a slower rate than the temperature of the heating coil for a given input voltage.

As the resistive path increases between the adjacent layers, the support leg 32 serves as a heat sink. Heat is conducted from the first layer 22 into the support leg 32, rather than into the second layer 24 which has expanded away from the first layer. The heat conducted into the support leg 32 is then dissipated by gas conduction into the hydrogen within the thyratron, or by conduction into the other structure within the thyratron. This stabilizes the reservoir temperature and allows the reservoir 10 to have a smaller total pressure range over a given input voltage range. Also, by using concentric cylinders with end plates, the reservoir 10 maintains concentricity as the temperature increases, which further regulates the thermal path within the reservoir and provides more uniform temperature at the outer surface of the reservoir material.

FIGS. 3 and 4 illustrate a second embodiment of a thermo-quiescent reservoir 40 for a gaseous-discharge device. The reservoir 40 includes a heater coil 14 that is potted within a ceramic material 44, such as alumina. The ceramic potting material 44 is formed into a cylindrical shape. Accordingly, a separate sleeve to enclose the heater coil 14 is not required, and the outer surface of the potting material 44 abuts directly with the first layer 22. The end plate 38 need not have the enlarged center hole as in the previous embodiment, since there is no sleeve extending therethrough. The center hole of the end plate 38 should be large enough to accommodate the terminal lead 16 while leaving space between the terminal lead and the end plate so that the elements are not in electrical contact. Alternatively, the end plate 38 may be constructed of electrically insulative material, such as ceramic. Otherwise, the reservoir 40 operates in the same manner as the reservoir 10 described above.

Figure 5:
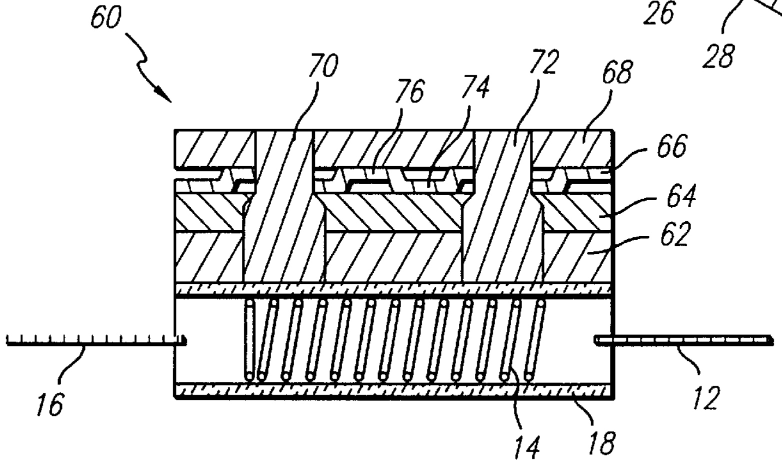
FIG. 5 is a sectional side view of a third embodiment of a thermo-quiescent reservoir system for a gaseous-discharge device.
Figure 6:
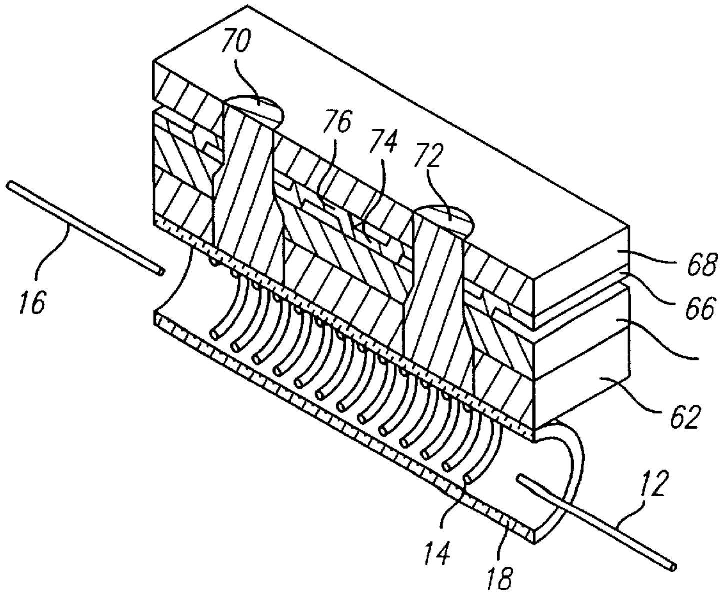
FIG. 6 is a partial perspective view of the thermo-quiescent reservoir system of FIG. 5.

FIGS. 5 and 6 illustrate a third embodiment of a thermo-quiescent reservoir 60 for a gaseous-discharge device. Unlike the previous two embodiments, the reservoir 60 is comprised of a plurality of flat plates of differing material compositions, rather than cylinders. The heater portion of the reservoir 60 is substantially identical to that of FIGS. 1 and 2, and includes a heater coil 14 disposed within a sleeve 18. The sleeve 18 is abutted tangentially with a laminate structure comprising plurality of plates, including plates 62, 64, 66 and 68. A pair of guide rods 70, 72 extend radially from the sleeve 18 and perpendicularly through the plates 62, 64, 66 and 68.

More particularly, the first plate layer 62 is comprised of a metallic material having generally high thermal conductivity and low coefficient of expansion, such as molybdenum. The second plate layer 64 is comprised of a metallic material having generally poor thermal conductivity and high coefficient of expansion, such as stainless steel. The third plate layer 66 is comprised of a metallic material having generally high ductility, such as nickel. Unlike the other layers, the third plate layer 66 is not perfectly flat, but rather has corrugations 74, 76 that define gaps between the third plate layer and the second and fourth plate layers 64, 68, respectively. The gaps will compress upon the expansion force of the second plate layer 64. Lastly, the fourth plate layer 68 is comprised of the reservoir material, such as titanium or zirconium. The reservoir 60 operates in the same manner as the reservoirs 10 and 40 of the previous embodiments. The guide rods 70, 72 are comprised of nickel, and operate similarly to the end plates 36, 38 of the previous embodiments in absorbing the disparate thermal expansion of the plate layers 62, 64, 66, 68.

Figure 7:
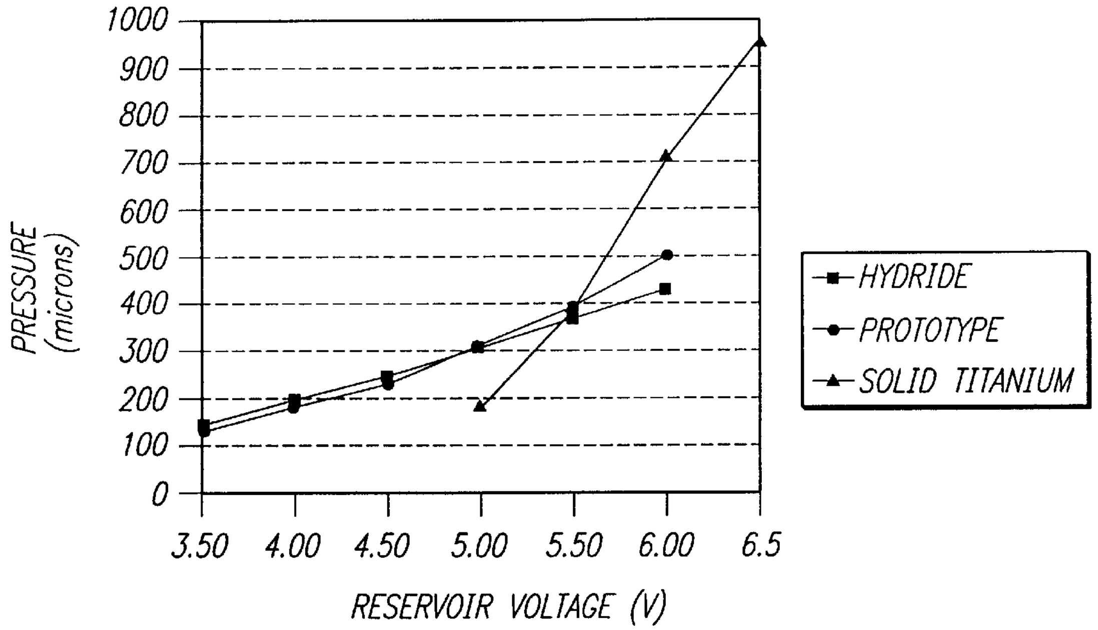
FIG. 7 is a graph comparing operation of the thermo-quiescent reservoir system of the present invention with the prior art reservoir systems.

The operating characteristics of a prototype reservoir constructed in accordance with the first embodiment is illustrated in FIG. 7 in comparison with prior art reservoirs using sintered titanium hydride and solid titanium. The prototype reservoir exhibits almost linear dP/dV characteristics that compare very favorably with the sintered titanium hydride reservoir, but without the high manufacturing cost generally associated with sintered titanium reservoirs. Moreover, the prototype reservoir does not exhibit the initial reverse negative or positive pressure swings as with the prior art hydrogen reservoirs.

Accordingly, it should be appreciated that the thermo-quiescent reservoir of the present invention allows superior performance in thyratron operation by increasing the operating range of the reservoir heater. Since the amount of pressure variation during operation is restricted, superior stability of the reservoir system is achieved. The reservoir construction makes advantageous use of different thermal expansion coefficients to vary thermal resistances, and different thermal conductivities to achieve the proper thermal resistance requirements. The heat sink disposed between the heater and the reservoir material attenuates the heat seen by the reservoir material to stabilize the temperature of the system. The material disposed between the reservoir material and the heater spreads the heat uniformly across the reservoir material. Further, the present reservoir achieves the improved pressure stability without requiring a barretter, thus eliminating the additional element that otherwise increases the cost and complexity of thyratron systems.

Having thus described a preferred embodiment of a thermo-quiescent reservoir system for a gaseous-discharge device, it should be apparent to those skilled in the art that certain advantages of the disclosed system have been achieved. It should also be appreciated that various modifications, adaptations, and alternative embodiments thereof may be made within the scope and spirit of the present invention. The invention is further defined by the following claims.

What is claimed is:

1. A reservoir system for a gaseous-discharge device, comprises:

a heater coil having electrical leads adapted to be coupled to a voltage source, said heater coil being adapted to generate heat in correspondence with a heater voltage provided by said voltage source;

an electrically insulating layer surrounding said heater coil;

a first thermally conductive layer coupled to said electrically insulating layer, said first thermally conductive layer being adapted to evenly conduct heat from said heater coil through said electrically insulating layer;

a second thermally conductive layer coupled to said first thermally conductive layer, said second thermally conductive layer having a coefficient of expansion substantially greater than that of said first thermally conductive layer and a thermal conductivity less than that of said first thermally conductive layer;

a third thermally conductive layer coupled to said second thermally conductive layer, said third thermally conductive layer comprising a ductile material to absorb expansion of said second thermally conductive layer; and a reservoir material layer coupled to said third thermally conductive layer, wherein thermal resistance between said reservoir material and said first thermally conductive layer increases as temperature of said heater coil increases due to thermal expansion of said second thermally conductive layer.

2. The reservoir system of claim 1, wherein said electrically insulating layer further comprises a ceramic cylinder sleeve with said heater coil being spaced therein.

3. The reservoir system of claim 1, wherein electrical insulator further comprises a ceramic cylinder having said heater coil potted therein.

4. The reservoir system of claim 1, wherein said first thermally conductive layer further comprises one of molybdenum and tungsten.

5. The reservoir system of claim 1, wherein said second thermally conductive layer further comprises stainless steel.

6. The reservoir system of claim 1, wherein said third thermally conductive layer further comprises nickel.

7. The reservoir system of claim 1, wherein said reservoir material further comprises one of zirconium and titanium.

8. The reservoir system of claim 1, wherein each of said first, second and third thermally conductive layers further comprise concentric cylinders.

9. The reservoir system of claim 1, wherein each of said first, second and third thermally conductive layers further comprise generally flat plates.

10. The reservoir system of claim 1, further comprising a thermal support leg coupled between respective ends of said first thermally conductive layer.

11. The reservoir system of claim 10, wherein said thermal support leg provides a heat sink for said reservoir system.

12. The reservoir system of claim 1, wherein said gaseous-discharge device further comprises a thyratron.

13. A reservoir system for a gaseous-discharge device, comprises:

a heater coil having electrical leads adapted to be coupled to a voltage source, said heater coil being adapted to generate heat in correspondence with a heater voltage provided by said voltage source;

a reservoir material layer adapted to regulate pressure of a gas within said gaseous-discharge device in accordance with temperature of said reservoir material; and means for transferring heat from said heater coil to said reservoir material, said transferring means having a thermal path resistance that increases as temperature of said heater coil increases so that said reservoir material increases in temperature at a slower rate than said heater coil.

14. The reservoir system of claim 13, wherein said transferring means comprises:

an electrically insulating layer surrounding said heater coil;

a first thermally conductive layer coupled to said electrically insulating layer, said first thermally conductive layer being adapted to evenly conduct heat from said heater coil through said electrically insulating layer;

a second thermally conductive layer coupled to said first thermally conductive layer, said second thermally conductive layer having a coefficient of expansion substantially greater than that of said first thermally conductive layer and a thermal conductivity less than that of said first thermally conductive layer; and a third thermally conductive layer coupled between said second thermally conductive layer and said reservoir material layer, said third thermally conductive layer comprising a ductile material to absorb expansion of said second thermally conductive layer.

15. The reservoir system of claim 14, wherein said first thermally conductive layer further comprises one of molybdenum and tungsten.

16. The reservoir system of claim 14, wherein said second thermally conductive layer further comprises stainless steel.

17. The reservoir system of claim 14, wherein said third thermally conductive layer further comprises nickel.

18. The reservoir system of claim 13, wherein said reservoir material layer further comprises one of zirconium and titanium.

19. The reservoir system of claim 14, wherein each of said first, second and third thermally conductive layers further comprise concentric cylinders.

20. The reservoir system of claim 14, wherein each of said first, second and third thermally conductive layers further comprise generally flat plates.

21. The reservoir system of claim 14, further comprising a thermal support leg coupled between respective ends of said first thermally conductive layer.

22. The reservoir system of claim 13, wherein said gaseous-discharge device further comprises a thyratron.

23. The reservoir system of claim 13, wherein said gas further comprises hydrogen.

24. The reservoir system of claim 13, wherein said gas further comprises deuterium.

25. The reservoir system of claim 13, further comprising means for dissipating excess heat from said heat transferring means.

26. The reservoir system of claim 25, wherein said heat dissipating means further comprises a heat sink.

27. A reservoir system for a gaseous-discharge device, comprises:

- a heater coil having electrical leads adapted to be coupled to a voltage source, said heater coil being adapted to generate heat in correspondence with a heater voltage provided by said voltage source;
- a reservoir material layer adapted to regulate pressure of a gas within said gaseous-discharge device in accordance with temperature of said reservoir material; and
- means for transferring heat from said heater coil to said reservoir material, said transferring means having a thermal path resistance that increases as temperature of said heater coil increases so that said reservoir material increases in temperature at a slower rate than said heater coil,
- wherein said transferring means comprises:
  - an electrically insulating layer surrounding said heater coil;
  - a first thermally conductive layer coupled to said electrically insulating layer, said first thermally conductive layer being adapted to evenly conduct heat from said heater coil through said electrically insulating layer;
  - a second thermally conductive layer coupled to said first thermally conductive layer, said second thermally conductive layer having a coefficient of expansion substantially greater than that of said first thermally conductive layer and a thermal conductivity less than that of said first thermally conductive layer; and
  - a third thermally conductive layer coupled between said second thermally conductive layer and said reservoir material layer, said third thermally conductive layer comprising a ductile material to absorb expansion of said second thermally conductive layer.

28. The reservoir system of claim 27 wherein said first thermally conductive layer further comprises one of molybdenum and tungsten.

29. The reservoir system of claim 27 wherein said second thermally conductive layer further comprises stainless steel.

30. The reservoir system of claim 27 wherein said third thermally conductive layer further comprises nickel.

31. The reservoir system of claim 27 wherein said reservoir material layer further comprises one of zirconium and titanium.

32. The reservoir system of claim 27 wherein each of said first, second and third thermally conductive layers further comprise concentric cylinders.

33. The reservoir system of claim 27 wherein each of said first, second and third thermally conductive layers further comprise generally flat plates.

34. The reservoir system of claim 27 further comprising a thermal support leg coupled between respective ends of said first thermally conductive layer.

35. A reservoir system for a gaseous-discharge device, comprises:

- a heater coil having electrical leads adapted to be coupled to a voltage source, said heater coil being adapted to generate heat in correspondence with a heater voltage provided by said voltage source;
- a reservoir material layer adapted to regulate pressure of a gas within said gaseous-discharge device in accordance with temperature of said reservoir material; and
- means for transferring heat from said heater coil to said reservoir material, said transferring means having a thermal path resistance that increases as temperature of said heater coil increases so that said reservoir material increases in temperature at a slower rate than said heater coil,
- wherein said reservoir material adsorbs/absorbs or releases the gas as the temperature of the reservoir material is varied.

36. A reservoir system for a gaseous-discharge device, comprises:

- a heater coil having electrical leads adapted to be coupled to a voltage source, said heater coil being adapted to generate heat in correspondence with a heater voltage provided by said voltage source;
- an electrically insulating layer surrounding said heater coil;
- a first thermally conductive layer coupled to said electrically insulating layer;
- a second thermally conductive layer coupled to said first thermally conductive layer;
- a third thermally conductive layer coupled between said second thermally conductive layer and said reservoir material layer, said third thermally conductive layer comprising a ductile material adapted to absorb expansion of said second thermally conductive layer; and
- a reservoir material layer adapted to regulate pressure of a gas within said gaseous-discharge device in accordance with temperature of said reservoir material,
- wherein said first, second and third thermally conductive layers have different thermal conductivity and coefficients of expansion; and
- wherein thermal resistance between said reservoir material and said first thermally conductive layer increases as temperature of said heater coil increases due to thermal expansion of said second thermally conductive layer.

37. The reservoir system of claim 36 wherein said reservoir material adsorbs/absorbs or releases the gas as the temperature of the reservoir material is varied.

* * * * *